Rohrbacher & Hormann,

Forming Smooth Tops on Glass Jars.

No. 106,624. Patented Aug. 23, 1870.

United States Patent Office.

FREDERICK ROHRBACHER AND FERDINAND HORMANN, OF PHILADELPHIA, PENNSYLVANIA, ASSIGNORS TO SALMON B. ROWLEY, OF SAME PLACE.

*Letters Patent No. 106,624, dated August 23, 1870.*

IMPROVED PROCESS OF FORMING SMOOTH TOPS ON GLASS JARS.

The Schedule referred to in these Letters Patent and making part of the same

We, FREDERICK ROHRBACHER and FERDINAND HORMANN, of Philadelphia, county of Philadelphia, State of Pennsylvania, have invented an Improvement in Glass Jars, and in a process of forming smooth tops for the same, of which the following is a specification.

Nature and Object of the Invention.

This invention consists—

First, of a mode or process, hereinafter described, of forming, on the extreme upper end of a glass jar, a smooth surface for receiving a packing-ring.

Secondly, of a mold-blown glass jar, terminating, at its extreme upper end, in an entirely unground blown bearing surface for receiving a packing-ring.

Thirdly, of a glass jar, having, at its upper end, a blown lip, the inner edge of which is ground or reduced, in combination with a cover having a projection adapted to the mouth, so as to isolate the packing-ring from the contents of the jar.

Description of the Accompanying Drawing.

Figure 1 illustrates the process of forming smooth-blown tops for glass jars, and shows the jar as it appears before being operated on.

Figure 1:
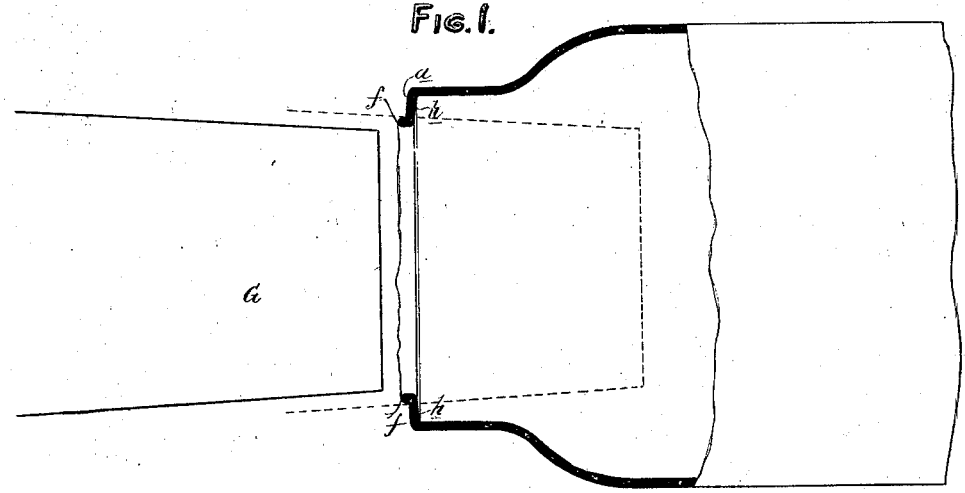

General Description.

In blowing glass jars in molds, there is always an "overblow," as it is termed, that is, a thin, hollow protuberance, which, after the jar has been blown and annealed, is struck off. A ragged projection, however, the remnant of this overblow, always remains on the jar, and this must be removed before the jar is saleable.

It will be observed that the jar illustrated in the drawing has an internal lip, $h$, and it is from the inner edge of this lip that the overblow takes its rise.

The ragged remnant of this overblow we do not remove by applying it directly to a grinding surface, as would be done if the ordinary method were practiced, as this plan would impair the mold-blown surface $a$, on which we rely as a smooth unground bearing for the packing-ring.

In order to preserve this bearing intact we use a conical grinder, G, or any other tool which can act laterally on the inside edge of the mouth, or can so reduce the same as to remove the overblow.

If the conical grinder G be used, all that is necessary is to hold the jar in the position seen in fig. 1, and then move the grinder forward until it has penetrated the mouth of the jar far enough to remove the remnant $f$ of the overblow. The result will be that shown in fig. 2, a perfectly true bearing, $a$, on the extreme upper end of the jar; and this bearing, having the natural smooth surface of the glass, is superior to a ground surface.

It may be remarked that, in blowing the jar in the mold, the truth of the bearing surface $a$ is always determined.

Figure 2:
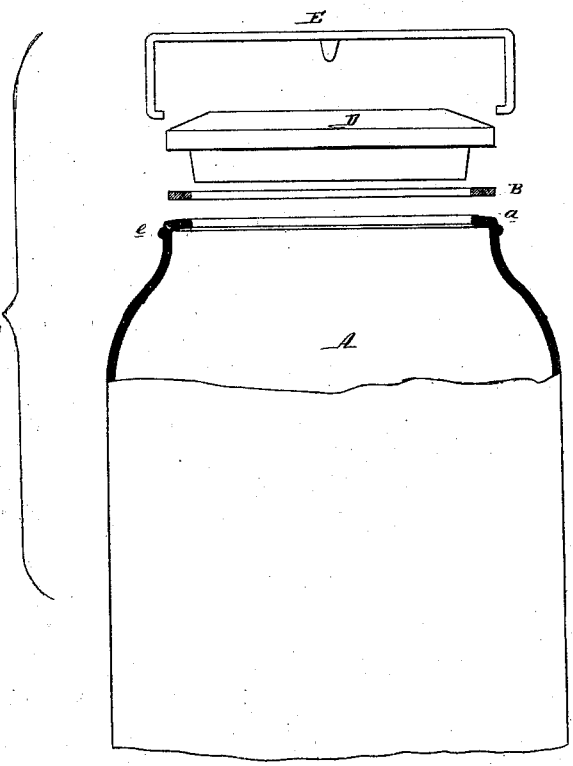
Figure 2 shows the glass jar complete, with packing-ring, cover, and fastener.

In fig. 2—

B is the rubber-ring;

D is the cover, made of glass in the present instance; and

E, a yoke, the bent ends of which are arranged to catch beneath the inclined projections, $e$, on the neck of the jar.

In ordinary jars the inner edge of the mouth is never exactly circular, and, consequently, a circular projection, such as that on the under side of the cover D, cannot fit so tightly as to prevent the contents of the jar from gaining access to the rubber packing, but, by reducing the inner edge of the lip $h$ substantially as described, it must be, necessarily, so true that the projection on the under side of the cover will fit snugly enough in it to isolate the rubber-ring from the contents of the jar.

It should be understood that our invention is in no way connected with any specific cover or fastening.

Claims.

1. The mode or process, substantially as described, of forming, on the extreme upper end of a glass jar, a smooth surface for receiving a packing-ring.

2. A mold blown-glass jar, terminating at its extreme upper end in an entirely unground, blown surface, for the packing-ring.

3. A glass jar, having, at its upper end, a blown lip, the inner edge of which is ground or reduced, in combination with a cover, having a circular projection adapted to the mouth.

In testimony whereof we have signed our names to this specification in the presence of two subscribing witnesses.

FREDK. ROHRBACHER.
FERDINAND HORMANN.

Witnesses:
F. B. RICHARDS,
HARRY SMITH.